US005929328A

United States Patent [19]

Seidenfuss

[11] Patent Number: 5,929,328

[45] Date of Patent: Jul. 27, 1999

[54] METHOD FOR CHECKING THE FUNCTION OF THE ELECTRICAL HEATER OF A LAMBDA PROBE IN THE EXHAUST LINE OF AN INTERNAL COMBUSTION ENGINE

[75] Inventor: Thomas Seidenfuss, Jetzendorf, Germany

[73] Assignee: Bayerische Mortoren Werke Aktiengesellschaft, Germany

[21] Appl. No.: 09/073,915

[22] Filed: May 7, 1998

[30] Foreign Application Priority Data

May 7, 1997 [DE] Germany ........................... 197 19 390

[51] Int. Cl.[6] ........................... F01N 09/00; G01M 15/00

[52] U.S. Cl. .......................... 73/118.1; 73/23.31; 60/276; 701/109

[58] Field of Search ............................... 73/23.31, 23.32, 73/116, 117.2, 117.3, 118.1; 701/109; 60/276, 277

[56] References Cited

U.S. PATENT DOCUMENTS

| | | | |
|---|---|---|---|
| 4,993,392 | 2/1991 | Tanaka et al. | 73/23.32 |
| 5,392,643 | 2/1995 | O'Kennedy et al. | 73/118.1 |
| 5,454,259 | 10/1995 | Ishill et al. | 73/23.32 |

FOREIGN PATENT DOCUMENTS

| | | |
|---|---|---|
| 38 42 287 | 8/1989 | Germany . |
| 41 32 008 | 4/1993 | Germany . |
| 43 35 814 | 5/1994 | Germany . |
| 43 44 961 | 7/1995 | Germany . |
| 196 12 387 | 10/1996 | Germany . |

*Primary Examiner*—George Dombroske
*Attorney, Agent, or Firm*—Evenson, McKeown, Edwards & Lenahan, P.L.L.C.

[57] ABSTRACT

In a method for checking the function of the electrical heater of a lambda probe in the exhaust line of an internal combustion engine, the electrical resistance of the heater is measured. Measurement of the electrical resistance of the heater is performed using a measuring current that is smaller than the heater current. During the measurement, the heater current switched off. The electrical resistance of the heater is preferably connected to a positive voltage to supply the (heating or measuring) current.

6 Claims, 1 Drawing Sheet

METHOD FOR CHECKING THE FUNCTION OF THE ELECTRICAL HEATER OF A LAMBDA PROBE IN THE EXHAUST LINE OF AN INTERNAL COMBUSTION ENGINE

BACKGROUND AND SUMMARY OF THE INVENTION

This application claims the priority of German priority document 197 19 390, filed May 7, 1997, the disclosure of which is expressly incorporated by reference herein.

The present invention relates to a method and apparatus for checking the function of the electrical heater of a lambda probe in the exhaust line of an internal combustion engine in which the electrical resistance of the heater is measured.

Methods of this type are known as shown, for example, in German patent document DE 41 32 08 A1. This method is also described below, with reference to the schematic diagram shown in FIG. 3 of the drawings.

Basically, a lambda probe is used to determine the oxygen content of the exhaust and the value thus obtained is supplied to a control device which serves to set a given air/fuel ratio. The lambda probe is functional only above a minimum operating temperature. Thus, the air/fuel mixture can be controlled by the lambda probe only when the lambda probe has reached its operating temperature. Only then can an air/fuel mixture that is optimum for low emissions be set. To keep emissions low, the lambda probe should reach operating temperature as soon as possible after the engine is started. Therefore, the heater of the lambda probe is accelerated by using an electrical heater. For low pollutant emissions, it is therefore necessary to check the function of the lambda probe heater. It is known that such heaters change with time, as a result of degradation of the electrical resistance over time.

In German patent document DE 41 32 008 A1, to check the lambda probe heater, the temperature-dependent electrical resistance of the lambda probe heater is measured when a certain operating temperature is reached. A device, as shown schematically in FIG. 3, for example, is also used for this purpose. The lambda probe heater is in the form of a heater resistor $R_L$ which is connected between the drain electrode of a field effect transistor T1 (or the collector of a bipolar transistor) and the positive pole of a battery. The source electrode of field effect transistor T1 (or the emitter of a bipolar transistor) is connected through a measuring resistor $R_{meas}$ to the negative pole of the battery or to ground. A control output of the microprocessor $\mu$P is connected to the control electrode of field effect transistor T1 (or to the base of a bipolar transistor). Microprocessor $\mu$P also has additional inputs and outputs for controlling a variety of functions. In addition, the source electrode of transistor T1 (or the emitter of a bipolar transistor) is connected to the input of an A/D converter through a resistor R2 or through an operational amplifier. The output of the converter is connected to an input of microprocessor $\mu$P. Heater resistor $R_L$ is supplied with battery voltage U+ when heater resistor $R_L$ is connected by a relay R with battery B and microprocessor $\mu$P connects transistor T1 to ground by controlling the control electrode. Alternatively, resistor $R_L$ can be connected directly with battery B, thus eliminating relay R.

In the method shown in German patent document DE 41 32 008 to A1, when the heater is switched on (in other words, with transistor T1 conducting), battery voltage U+ and measuring voltage $U_{meas}$ (which is dropped by measuring resistor $R_{meas}$) are detected. In conjunction with the known value of measuring resistor $R_{meas}$, heater resistor $R_L$ is also calculated using microprocessor $\mu$P (see also FIG. 3).

The resistance of the lambda probe heater is very low at ambient temperature in comparison to the operating temperature. As a result of this, a very large current flows when the lambda probe heater is switched on. If the measuring resistance is sized such that a sufficiently accurate measurement is possible at operating temperature, a high power is converted into heat in the measuring resistance during the warm-up phase of the lambda probe. In previous regulating devices, for example engine control devices, this problem is solved by using a high-power measuring resistance or by reducing the power output by cycling the heater current. A high-power measuring resistance however requires a large PC board area and is relatively cost-intensive. On the other hand reducing the power cyclically undesirably prolongs the period of time until lambda control is possible.

It is therefore an object of the present invention to improve upon the prior method by eliminating a high-power measuring resistance without unnecessarily lengthening the period of time until proper lambda regulation is established.

This and other objects and advantages are achieved according to the present invention, by measuring the electrical resistance of the heater with the heater current switched off. This results in the heater being subjected to a measuring current that is smaller than the heater current. Preferably this resistance measurement is performed when the lambda probe has reached its operating temperature.

Unlike the prior art (i.e., German patent document DE 41 32 008 A1, in which the heater is switched to ground to connect it to the (heater) current), in an advantageous embodiment of the invention, the heater is connected to a positive voltage to expose it to (measuring or heating) current. As a result, the measurement of the heater resistance is simplified, especially since the entire A/D converter range can be used.

With the method and apparatus according to the present invention, the power loss that occurs during resistance measurement is avoided, since the heater resistance is not measured during the time that the resistor is subjected to heating current, but only when it is switched off.

Other objects, advantages and novel features of the present invention will become apparent from the following detailed description of the invention when considered in conjunction with the accompanying drawings.

DETAILED DESCRIPTION OF THE DRAWINGS

Figure 1:
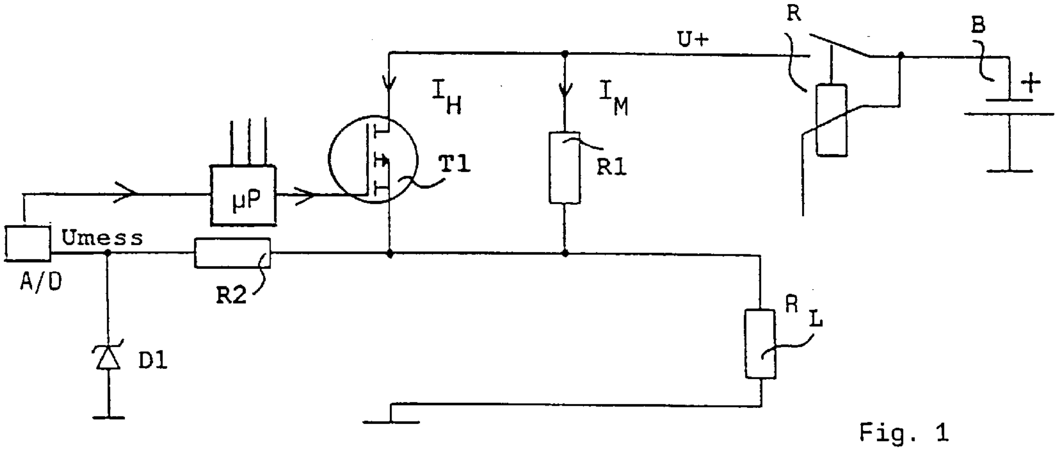
FIG. 1 is a circuit for the method and apparatus according to the invention in accordance with a first alternative.

In the drawing, identical parts have been given the same reference numbers. In FIG. 1, in contrast with the prior art (FIG. 3), a resistance R1 (through which a measuring current $I_M$ is specified) is connected in parallel with transistor T1. Heater resistance $R_L$ (the electrical resistance of the heater to be measured) is connected to the source electrode of transistor T1 (or to the emitter of a bipolar transistor) and permanently to ground.

When a given operating temperature of the lambda probe is reached, the heater is preferably switched off in a first step, in other words transistor T1 is blocked so that no heater current $I_H$ can flow. When relay R is closed, only a small measuring current $I_M$ flows through resistance R1. The current is also supplied to the probe heater and/or its heater resistance $R_L$. Microprocessor $\mu$P calculates the value of the heater resistance $R_L$ from the voltage drop $U_{meas}$ across heater resistor $R_L$, the known value of resistance R1, and battery voltage U+. It should also be noted that heater resistance $R_L$ can also be measured at any other probe temperature and/or in the cold state, i.e., in the unheated state.

Since there is a known relationship between the probe temperature and/or the temperature of the heater resistance and the ohmage of the heater resistance, the measured heater resistance can be used to determine the current probe temperature. Additionally, the measured value of the heater resistance can be compared with a value to be expected at a known probe temperature. Thus, if the difference between these values exceeds a certain threshold an error has occurred.

To monitor the correct function of the heater, a previously established curve of the ohmic values of the heater resistance over a given period of time can be compared with a curve that has actually been measured.

In order for the measuring voltage $U_{meas}$ to be present over the entire voltage range of the A/D converter, one lead of the lambda probe heater or heater resistance $R_L$ is permanently connected to ground, while the other lead can be connected to battery voltage U+. A diode D1 connected to ground between resistance R2 and the A/D converter limits the voltage at the A/D converter input when the heater is switched on. If resistance R2 is set to a very high value and the A/D converter input is simultaneously sufficiently protected internally, diode D1 can also be eliminated. The main relay R, usually provided in motor vehicles, ensures that the measuring current will be switched off when the vehicle is parked.

Figure 2:
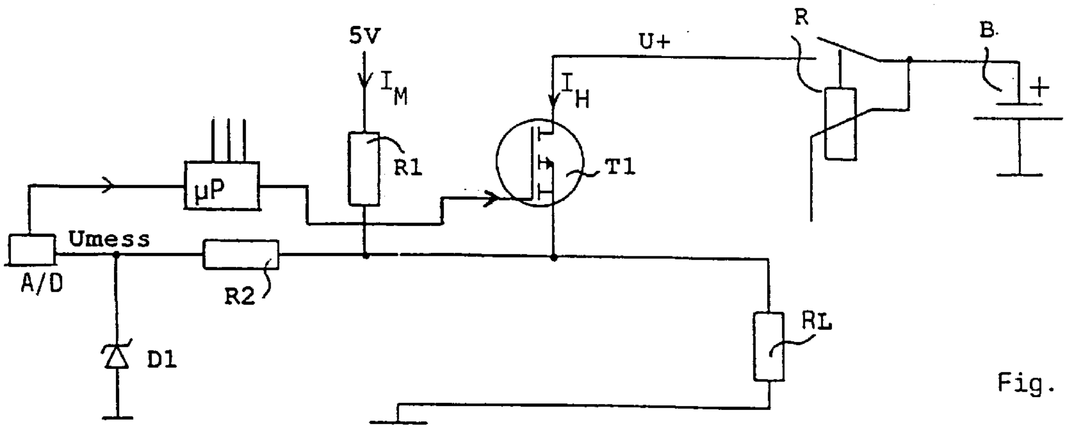
FIG. 2 is a second embodiment of a circuit according to the invention.

FIG. 2 shows an alternative embodiment of the present invention (with reference to FIG. 1), In this embodiment, resistance R1 is also subjected to a measuring voltage of 5V instead of the battery voltage U+. A voltage of 5V is the usual supply voltage of a control device in a regulating device. At the same time, the 5V voltage usually serves as the reference for the A/D converter (so that measurement of battery voltage U+ can be eliminated).

Figure 3:
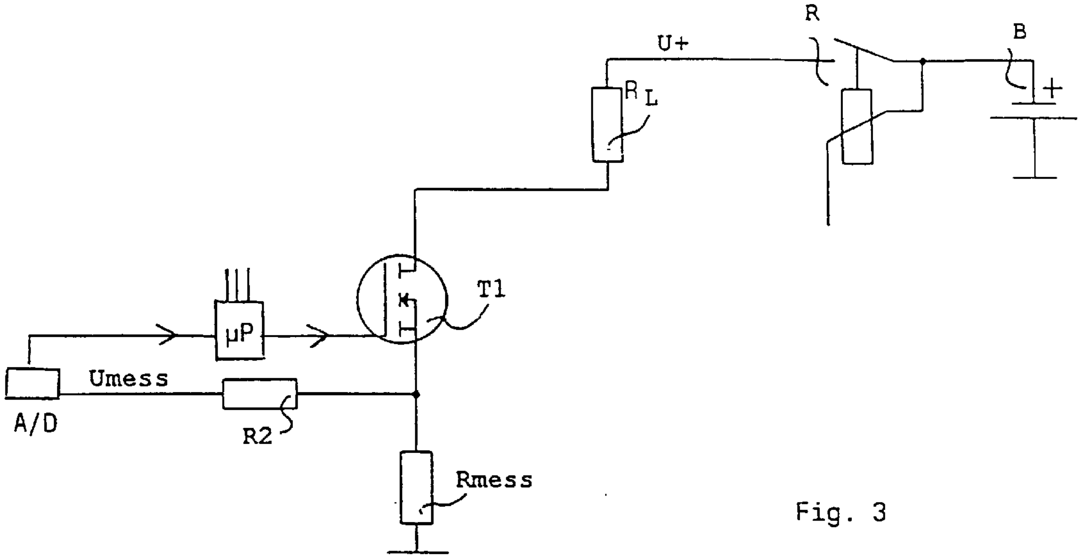
Fig. 3 PRIOR ART
FIG. 3 shows an apparatus for the method used in the prior art.

The circuits in FIGS. 1 to 3 may be integrated into internal combustion engine control devices (not shown) that also regulate an optimum air/fuel mixture.

The following component values for the circuits in FIG. 1 and FIG. 2 are especially advantageous:

R1=1 KOhm

R2=47 KOhm $R_L$=2 Ohm when cold $R_L$=9 ohms at operating temperature

U+=13 V

Resolution of A/D converter=10 bits.

With embodiments according to the present invention, in contrast to circuits in use, high-power low-resistance measuring resistance ($R_{meas}$) can be eliminated. For a resistance R1 for determining measuring current $I_M$, for example, a 1% SMD standard resistance of type 1206 can be used. This reduces cost and saves space on the PC board, especially in view of the fact that frequently several lambda probes must be provided for each control device.

The foregoing disclosure has been set forth merely to illustrate the invention and is not intended to be limiting. Since modifications of the disclosed embodiments incorporating the spirit and substance of the invention may occur to persons skilled int eh art, the invention should be construed to include everything within the scope of the appended claims and equivalents thereof.

What is claimed is:

1. A method for checking the function of an electrical heater of a lambda probe in an exhaust line of an internal combustion engine, in which an electrical resistance of the heater is measured, comprising the steps of:

interrupting a flow of heating current through said heater of said lambda probe;

subjecting the heater of the lambda probe to a measuring current which is smaller than said heating current; and measuring electrical resistance of said heater while said measuring current is flowing therein.

2. The method according to claim 1, wherein the electrical resistance of the heater is connected to a positive voltage to subject it to a heating or measuring current.

3. An apparatus for checking the function of an electrical heater of a lambda probe, comprising:

a first resistance coupled in series between said heater and a relay which is coupled to a fixed voltage source for supplying a measuring current to said heater;

a transistor coupled in parallel with said first resistance for deactivating a flow of heating current to said heater;

a circuit for controlling said transistor to interrupt said measuring current; and a microprocessor coupled to measure a resistance of said heater with only said measuring current flowing therein.

4. The apparatus according to claim 3, wherein a third resistor is coupled to VCC and the source electrode of the transistor.

5. The method according to claim 1, further comprising the steps of:

comparing measured values of electrical resistance of the heater of the lambda probe to expected values;

calculating differences between the measured values and the expected values to obtain difference values; and comparing the difference values to threshold values to determine failure of the heater of the lambda probe.

6. The method according to claim 5, wherein the step of comparing the measured values of electrical resistance of the heater of the lambda probe to the stored expected values comprises:

comparing at least one expected ohmic value curve of the heater of the lambda probe to at least one measured ohmic curve of the heater of the lambda probe.

* * * * *